UNITED STATES PATENT OFFICE.

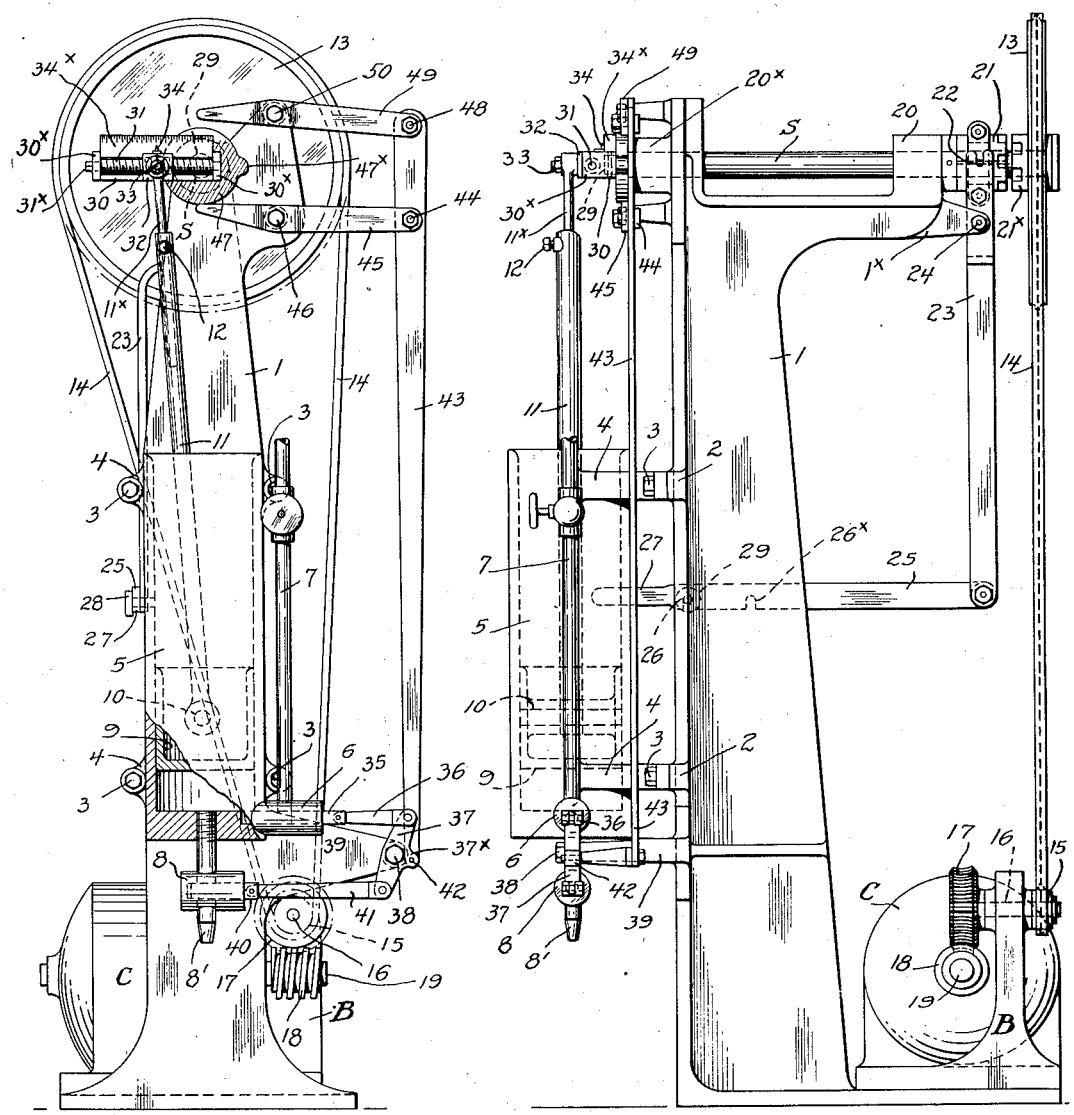

ERNST EGER, OF DETROIT, MICHIGAN, ASSIGNOR TO MORGAN & WRIGHT, A CORPORATION OF MICHIGAN.

PUMP AND SIMILAR APPARATUS.

1,389,548.     Specification of Letters Patent.     Patented Aug. 30, 1921.

Original application filed June 18, 1919, Serial No. 305,154. Divided and this application filed March 22, 1921. Serial No. 454,432.

*To all whom it may concern:*

Be it known that I, ERNST EGER, a citizen of the United States, residing at Detroit, in the county of Wayne and State of Michigan, have invented certain new and useful Improvements in Pumps and Similar Apparatus, of which the following is a full, clear, and exact description.

This invention relates more particularly to valve mechanisms for pumps and similar apparatus employing a fluid chamber and a member therein connected to a member outside and adapted to be operated in unison therewith, and is a divisional application of my pending application Serial No. 305,154, filed June 18, 1919, a feature of the present invention being the controlling of the valves by means of the said member outside the fluid chamber of the pump or other similar device.

The invention will be understood by the accompanying drawings, in which:

Figure 1 is a front elevation, partly in section, of an apparatus embodying the invention; and Fig. 2 is a side elevation of the same.

While the invention is not confined to any particular device but is of general application as indicated above it will, however, for the purpose of illustration be described in connection with a liquid measuring pump with which it is especially adapted.

The embodiment of the invention illustrated in the drawing consists of a standard 1 provided with laterally extending lugs 2, the latter being apertured to receive bolts 3 which pass through apertured lugs 4 formed on a pump cylinder 5, the bolts thus serving to secure the pump cylinder to the standard.

The pump cylinder at its lower end is provided with an inlet valve, the valve casing 6 of which communicates with a pipe 7 leading to a source of supply for the liquid. The pump cylinder is also provided with an outlet valve, the outlet valve casing 8 communicating with a nozzle 8' through which the liquid is discharged from the pump. The pump piston 9 is pivotally connected at 10 to a piston rod 11, 11×, and member 11× telescoping into an axial bore formed in the member 11, the two members being rigidly connected in the desired adjusted position by means of a set screw 12.

The piston rod is driven, through certain connections hereinafter described, by means of a rotary shaft S journaled in bearing bosses 20, 20×, rising from the standard 1, said shaft having keyed thereon a sliding clutch member 21 adapted for engagement with a similar clutch member 21× formed on the hub of a drive wheel 13 loosely mounted on the drive shaft. Drive wheel 13, in this instance a sprocket, is constantly driven by means of chain 14, the chain being led around a small sprocket 15 on a shaft 16 journaled in suitable bearings provided by a short standard B. The shaft 16 carries a worm wheel 17 in mesh with a worm 18 on shaft 19, the latter being driven by a motor C.

Clutch member 21 carries a projecting stud 22 engaged by the yoked end of a clutch operating-lever 23, fulcrumed at 24 upon an extension 1× of standard 1. And the said operating lever 23 at its lower end is pivotally connected to an arm 25 formed with notches 26, 26×, the said arm being provided with a handle 27. A stud 28 is secured to the standard, and is of a size to be received within either of the said notches. When the arm is disposed as shown in Fig. 2, with a notch 26 in register with stud 28, the clutch is held disengaged by lever 23. By moving arm 25 to the left of the figure, so that notch 26× will be placed in register with the stud 28, lever 23 will be operated to throw the clutch members into engagement so that the drive shaft will be rotated to operate the pump.

The adjustable connections intermediate the pump piston and drive shaft S are as follows: Secured to the shaft S, by means of the tapered pin 29, or otherwise, is an arm 30 formed at its opposite ends with the angular extensions 30× which serve as bearing members for a screw 31 the latter being formed with a squared end 31× to receive a wrench or other adjusting member. Threaded upon screw 31 is a block 32, the said block being pivotally connected at 33 with the upper member 11× of the piston rod.

The block 32 carries a pointer 34 so that the exact position of the block with respect to the arm may be indicated by the pointer upon a plate 34× carried by the arm and marked with a graduated scale.

It will be understood by reference to Fig. 1 that as the block 32 is moved to the left and hence away from the axis of movement of the arm, a correspondingly longer stroke will be given to the piston rod 11 and piston 9, and hence a correspondingly greater quantity of liquid will be forced into the pump chamber. The graduations on plate 34ˣ may indicate either volume or weight of the liquid, as will be understood without further explanation.

When the stroke of the piston is increased, it may be necessary to correspondingly change its position to a point more remote from the bottom wall of the chamber. To this end the piston rod is made sectional for adjustment as to length. Thus when it is desired to measure a greater volume of liquid, the block 32 is adjusted accordingly, the nut 12 loosened, and the length of the piston shortened by moving the member 11 upwardly in proportion with the increase of the stroke of the piston, the effect of these combined adjustments being to increase the stroke of the piston and the quantity of liquid forced into the pump chamber.

The inlet and outlet valves of the pump are automatically operated by means of the following instrumentalities: The inlet valve casing 6 is provided with a slide valve member 35 connected by link 36 with an operating lever 37 fulcrumed at 38 upon a bracket 39 extending from standard 1; and the outlet valve casing is provided with a sliding valve member 40 connected by link 41 with the opposite end of lever 37. Operating lever 37 is provided with a short arm 37ˣ pivotally connected at 42 with a link 43 connected at 44 with a lever 45 fulcrumed at 46 upon the standard 1, the lever 45 being in register with a cam 47 on drive shaft S. Link 43 at its upper end is also pivotally connected by stud 48 with a lever 49 fulcrumed at 50 upon the said standard 1 and in register with the said cam 47. The cam 47 is provided with a peripheral projection 47ˣ which is adapted to operate the levers 45 and 49 in succession to move link 43 alternately in opposite directions, serving thereby to operate lever 37 and, through the latter, the inlet and outlet valves.

In the operation of the apparatus (assuming the piston 9 to be in its lowermost position after the conclusion of a discharge stroke) the movement of clutch arm 25 to the left from its position in Fig. 2 will swing link 23 in a direction to engage the clutch members. Thereupon the rotation of drive wheel 13 will effect a corresponding rotation of the main drive shaft, and arm 30 connected with the piston rod will be moved upwardly, a corresponding movement being given to the piston. Preliminary to the upward stroke of the piston, the raised portion 47ˣ of cam 47 will engage and impart a "kick" to the inner end of lever 49, thus moving link 43 downwardly and swinging valve operating lever 37 in a direction to open the inlet valve and close the outlet valve. The upward or suction stroke of the piston will continue until it reaches its final position, at which point the raised peripheral portion of cam 47 will engage and impart a "kick" to lever 45, thereby moving link 43 upwardly and reversing the position of lever 37, this movement of lever 37 closing the inlet valve and opening the outlet valve for the discharge of the liquid from the pump cylinder. The continued rotation of the shaft will, through arm 30, move the piston rod and piston downwardly, the liquid being forced through nozzle 8'.

The telescopic construction of the piston rod permits the piston in its stroke to start from the bottom of the cylinder, and thus the cylinder may be cleared of liquid at the end of each downward stroke when desired.

Having thus described my invention what I claim and desire to protect by Letters Patent is:—

1. In apparatus of the character described, a chamber, a piston within the said chamber, inlet and outlet valves communicating with the said chamber, means for operating the said piston, a valve operating lever provided with connections with the valves whereby a movement of the lever will open the inlet valve and close the discharge valve or vice versa, and operative connections between the said valve operating lever and the piston operating means comprising a cam, lever arms adapted for alternate actuation in reverse directions by said cam, and a link connecting said arms with the valve operating lever.

2. In apparatus of the character described, a chamber, a piston within the said chamber, means for operating the said piston, including a shaft, inlet and outlet valves for the chamber, a valve-operating lever, connections intermediate the said lever and each of the valves whereby a movement of the lever will open one valve and close the other, a link connected with the valve operating lever, two link operating levers, and a member carried by the said shaft and adapted to actuate the link-operating levers in succession to move the said link in opposite directions during each reciprocation of the piston.

Signed at Detroit, county of Wayne, and State of Michigan, this 14th day of March, 1921.

ERNST EGER.